United States Patent Office 2,779,458
Patented Jan. 29, 1957

2,779,458

SELECTIVE SOLVENT FOR ACETYLENE

William T. Nelson, Bartlesville, Okla., assignor to Phillips Petroleum Company, a corporation of Delaware No Drawing. Application December 22, 1952,
Serial No. 327,411

10 Claims. (Cl. 206—.7)

This invention relates to a novel selective solvent for acetylene. In one of its more specific aspects, this invention relates to a novel selective solvent for the removal of acetylene from a gaseous hydrocarbon mixture containing a minor portion of acetylene. In another of its more specific aspects, it relates to a method for preparing an acetylene solution for the storage of acetylene. In still another of its more specific aspects, it relates to a method for the recovery of acetylene contained as a minor constituent in a gaseous hydrocarbon mixture.

Acetylene may be produced by thermal treatment of hydrocarbons by a variety of methods. Among such methods are the treatment of hydrocarbons of the methane and ethylene series by controlled pyrolisis, passage of such hydrocarbons through an electric arc, incomplete combustion, and the like.

Acetylene is formed as a minor constituent in refinery streams resulting from cracking, dehydrogenation and other similar reactions involving thermal or catalytic treatment of hydrocarbon fractions or petroleum derivatives. These gaseous streams usually contain a relatively small percentage of acetylene as compared to the other constituents which may be present, such as hydrogen, methane, ethylene, ethane, nitrogen, or the like. A major problem arises in the separation of the several constituents of such gaseous mixtures and particularly the concentration and/or separation of acetylene.

For the recovery of acetylene from gaseous mixtures, the selective solvent action of various compounds and mixtures of compounds have been used. The most commonly employed solvent is acetone; however, other solvents such as the dialkyl formamides, the aliphatic lactones, the esters of polyhydric alcohols, the polyketones, and the like have been either proposed or used. An ideal solvent for acetylene should have the properties of high solubility for acetylene, high selectivity for acetylene over the other constituents of the gaseous mixture, high boiling point, high thermal stability, low vapor pressure at ordinary temperatures and absence of chemical reaction with acetylene or other constituents of the gaseous stream. Although the compounds heretofore suggested for this purpose accomplish acetylene removal and recovery, they do not, in each case, possess all of the above properties and thus there is considerable room for improvement.

A liquid having high solvent power for acetylene is also important in the storage of acetylene in pressure retaining vessels. Acetylene is commonly stored in pressure containers which are partially filled with balsa wood or other absorbent and porous material into which the solvent containing dissolved acetylene is introduced under pressure. The higher the solvent power of the solvent used, the larger is the volume of acetylene which may be introduced in the container at a stated pressure, and solvents of high solvent power are therefore desirable.

In at least one modification of this invention at least one of the following objects is attained.

It is an object of this invention to provide a selective solvent for acetylene.

Another object is to provide a method for the separation of unsaturated hydrocarbons from less unsaturated hydrocarbons.

Another object is to provide a method for the selective removal and recovery of acetylene from gaseous mixtures. Another object is to provide a new composition of matter consisting of acetylene dissolved in a novel solvent. It is still another object to provide selective solvents for unsaturated hydrocarbons in the presence of less unsaturated hydrocarbons. It is still another object to provide an improved method for storage of acetylene. Other objects will be apparent to one skilled in the art upon reading this disclosure of the invention.

I have discovered that ethylene diamine is an effective selective solvent for alkyne hydrocarbons in the presence of olefins and paraffins. I have also discovered that ethylene diamine is an effective selective solvent for separating unsaturated hydrocarbons from less unsaturated hydrocarbons in general and is particularly applicable to the separation of acetylene from gaseous mixtures containing acetylene. The capacity of ethylene diamine for dissolving acetylene has been found to be comparable to that of other solvents, but tthe selectivity of ethylene diamine for acetylene over ethylene has been found to be very high. The solubility of acetylene in ethylene diamine at 25° C. and 1 atmosphere partial pressure of the gas has been found to be 13.4 cc. of gaseous acetylene, calculated at standard temperature and pressure, per milliliter of ethylene diamine. The solubility of ethylene in ethylene diamine under the same conditions is only 0.82 cc. of gaseous ethylene at standard temperature and pressure per milliliter of solvent. The selectivity (ratio of solubilities) of ethylene diamine for acetylene over ethylene has been found to be 16.4/1 at 25° C. and 1 atmosphere partial pressure of gas.

I prefer to practice the separation process of my invention upon gaseous hydrocarbons, however the invention is also applicable to liquid hydrocarbons.

The novel solvent of my invention also possesses other properties which make it very useful as a solvent for acetylene. Some of these properties are given in Table I.

TABLE I

*Properties of ethylene diamine*

| | Ethylene diamine |
|---|---|
| Molecular weight | 60.10 |
| Boiling pt., ° C | 116.5 |
| Vapor pressure @ 20° C., mm. Hg | 10.7 |
| Density 20° C | 0.8995 |
| Freezing pt., ° C | 10.8 |

In an acetylene recovery process, the acetylene-containing effluent stream is subjected to countercurrent scrubbing in any suitable absorption tower, such as a spray, packed, or bubble plate tower. The solvents need not be pure compounds and may be admixed with either each other, other acetylene solvents, or liquid materials which have no solvent action on acetylene. The temperatures and pressures employed may vary over wide limits but very often ordinary temperatures and pressures are used. It is preferred to operate at a temperature substantially below the boiling point of the solvent and above the dew point of the gaseous mixture at the existing pressure. At very low temperatures, for a fixed pressure, the solubility of acetylene is increased, but the solubility of other constituents may be also so great that little selectivity is obtained; whereas, at high temperatures so little acetylene may be dissolved that selectivity is of little consequence. The use of super atmospheric pressure improves the capacity of the solvent for acetylene, but requires more expensive equipment.

The acetylene selectively absorbed in the solvent along with small amounts of other gases, is recovered by either heating the solvent to expel the gas, reducing the pressure over the solution to effect a separation of the dissolved gas, or by using a combination of both features. Thereafter, the solvent is recirculated in the system.

Reasonable variations and modifications are possible within the scope of the present invention, the essence of which is that ethylene diamine has been found to be an excellent selective solvent for the removal of unsaturated hydrocarbons from less unsaturated hydrocarbons, particularly for the removal of acetylene from other gases.

I claim:

1. The process of separating an unsaturated hydrocarbon from a less unsaturated hydrocarbon which comprises contacting said hydrocarbons with a solvent consisting essentially of ethylene diamine at a temperature below about 116° C. and at substantially atmospheric pressure and separating ethylene diamine containing dissolved unsaturated hydrocarbons from the remaining less unsaturated hydrocarbons.

2. The process of removing acetylene from the gaseous effluent of a hydrocarbon reaction process wherein acetylene is present as a minor constituent which comprises contacting said gaseous effluent with ethylene diamine at a temperature below about 116° C. and substantially atmospheric pressure; and separating ethylene diamine containing dissolved acetylene from the remaining hydrocarbons.

3. A composition of matter which consists essentially of acetylene dissolved in ethylene diamine.

4. A package which comprises a pressure resistant container, an absorbent material saturated with ethylene diamine and acetylene.

5. A method for the storage of acetylene which comprises dissolving acetylene in ethylene diamine and confining a resulting solution in a storage zone.

6. The process of purifying an ethylene stream containing acetylene as an impurity which comprises contacting said ethylene stream in the gaseous phase with ethylene diamine and separating ethylene diamine containing dissolved acetylene from the purified ethylene stream.

7. A process for recovering acetylene contained as a minor constituent in the reactor effluent gases resulting from the catalytic cracking of hydrocarbons which comprises countercurrently contacting said gases with ethylene diamine in a contacting zone at a temperature below about 116° C. and at substantially atmospheric pressure; passing ethylene diamine containing dissolved acetylene to a separation zone; heating the mixture of ethylene diamine and acetylene so as to expel the acetylene from the mixture; recovering acetylene as a product of the process; recovering ethylene diamine substantially freed of acetylene; and returning said ethylene diamine to said contacting zone.

8. The process of separating an alkyne hydrocarbon from a mixture containing alkyne hydrocarbons, olefin hydrocarbons and paraffin hydrocarbons which comprises containing said hydrocarbons with a solvent consisting essentially of ethylene diamine at a temperature below about 116° C. and separating ethylene diamine containing dissolved alkyne hydrocarbon from the remaining hydrocarbons.

9. The process for separating acetylene from a gaseous mixture comprising ethylene, ethane and methane in admixture with the acetylene, which comprises contacting said gaseous mixture with ethylene diamine at a temperature below about 116° C. and at substantially atmospheric pressure and separating ethylene diamine containing dissolved acetylene from the remaining hydrocarbons of the gaseous mixture.

10. A process for separating an alkyne hydrocarbon from admixture with a more saturated hydrocarbon which comprises contacting said admixture with a solvent consisting essentially of ethylene diamine.

References Cited in the file of this patent

UNITED STATES PATENTS

| Number | Name | Date |
|---|---|---|
| 1,003,559 | Whitaker et al. | Sept. 19, 1911 |
| 1,866,800 | Deanesly | July 12, 1932 |
| 2,146,448 | Scott | Feb. 7, 1939 |
| 2,356,986 | Frey | Aug. 29, 1944 |
| 2,363,298 | Rosset | Nov. 21, 1944 |
| 2,396,300 | Cummings et al. | Mar. 12, 1946 |
| 2,401,852 | Arnold et al. | June 11, 1946 |
| 2,405,693 | Hamill et al. | Aug. 13, 1946 |
| 2,441,400 | Doumani et al. | May 11, 1948 |
| 2,623,611 | Levine et al. | Dec. 30, 1952 |
| 2,667,234 | Hasche | Jan. 26, 1954 |